United States Patent
Sun et al.

(10) Patent No.: US 8,596,538 B2
(45) Date of Patent: Dec. 3, 2013

(54) BARCODE DECODING CHIP

(75) Inventors: Yali Sun, Fuzhou (CN); Dong Guo, Fuzhou (CN); Rongsheng Liu, Fuzhou (CN); Xianfu Wang, Fuzhou (CN); Lunyu Hu, Fuzhou (CN); Wenchuan Chen, Fuzhou (CN); Qiang Cai, Fuzhou (CN); Xiaodan Cai, Fuzhou (CN); Qingcai Zhang, Fuzhou (CN); Chunguang Zheng, Fuzhou (CN); Yousen Qiu, Fuzhou (CN); Zhilong Lin, Fuzhou (CN); Guoliang Zhuang, Fuzhou (CN); Zhiyu Wu, Fuzhou (CN)

(73) Assignee: Fujian Newland Computer Co., Ltd., Fuzhou, Fujian Province (CN)

( * ) Notice: Subject to any disclaimer, the term of this patent is extended or adjusted under 35 U.S.C. 154(b) by 33 days.

(21) Appl. No.: 13/149,820

(22) Filed: May 31, 2011

(65) Prior Publication Data
US 2011/0290877 A1 Dec. 1, 2011

(30) Foreign Application Priority Data

| Jun. 1, 2010 | (CN) | 2010 1 0188826 |
| Jun. 1, 2010 | (CN) | 2010 1 0188897 |
| Jun. 1, 2010 | (CN) | 2010 1 0189015 |
| Jun. 1, 2010 | (CN) | 2010 1 0189073 |
| Jun. 1, 2010 | (CN) | 2010 1 0189803 |
| Jun. 1, 2010 | (CN) | 2010 1 0189805 |

(51) Int. Cl.
*G06K 7/10* (2006.01)
*G06K 5/04* (2006.01)
*G06K 9/32* (2006.01)

(52) U.S. Cl.
USPC .................... 235/462.01; 235/462.08

(58) Field of Classification Search
USPC .......... 235/435, 462.01, 462.08, 462.25, 436, 235/439, 462.09–462.12; 382/199
See application file for complete search history.

(56) References Cited

U.S. PATENT DOCUMENTS

| 5,134,272 A * | 7/1992 | Tsuchiya et al. ......... 235/462.08 |
| 5,243,655 A * | 9/1993 | Wang ................. 380/51 |
| 5,365,048 A * | 11/1994 | Komiya et al. .......... 235/462.08 |
| 5,471,041 A * | 11/1995 | Inoue et al. ............... 235/462.09 |
| 5,489,769 A * | 2/1996 | Kubo ....................... 235/462.09 |
| 5,550,365 A * | 8/1996 | Klancnik et al. ......... 235/462.25 |
| 5,616,905 A * | 4/1997 | Sugiyama ..................... 235/456 |
| 5,635,697 A * | 6/1997 | Shellhammer et al. .. 235/462.11 |
| 5,723,853 A * | 3/1998 | Longacre et al. ........ 235/462.07 |
| 5,726,435 A * | 3/1998 | Hara et al. .................... 235/494 |
| 5,736,724 A * | 4/1998 | Ju et al. ..................... 235/462.11 |
| 6,267,296 B1 * | 7/2001 | Ooshima et al. .............. 235/487 |
| 6,490,376 B1 * | 12/2002 | Au et al. ........................ 382/290 |
| 6,565,003 B1 * | 5/2003 | Ma ............................. 235/462.1 |
| 7,380,718 B2 * | 6/2008 | Nakamura ............... 235/462.01 |
| 7,487,916 B2 * | 2/2009 | Cai et al. .................. 235/462.15 |
| 2004/0020989 A1 * | 2/2004 | Muramatsu ................ 235/462.1 |
| 2009/0067731 A1 * | 3/2009 | Rudeen et al. ................ 382/232 |
| 2010/0200660 A1 * | 8/2010 | Moed et al. ................... 235/470 |

\* cited by examiner

*Primary Examiner* — Michael G Lee
*Assistant Examiner* — Suezu Ellis
(74) *Attorney, Agent, or Firm* — Cheng-Ju Chiang

(57) ABSTRACT

An exemplary barcode decoding chip includes a scan module, a boundary identification module, a direction identification module, a bar space boundary processing module, a symbol parameter identification module, a symbol character extraction module, and a decoding module.

17 Claims, 4 Drawing Sheets

BARCODE DECODING CHIP

CROSS-REFERENCE TO RELATED PATENT APPLICATIONS

This application claims the benefit, pursuant to 35 U.S.C. §119(a), of P.R. China Patent Application Nos. 201010189015.9, filed on Jun. 1, 2010, entitled "MicroPDF417 Barcode Decoder Chip", 201010189805.7, filed on Jun. 1, 2010, entitled "Determinant Barcode Decoder Chip", 201010189803.8, filed on Jun. 1, 2010, entitled "PDF417 Barcode Decoder Chip", 201010189073.1, filed on Jun. 1, 2010, entitled "Composite Yards Barcode Decoder Chip", 201010188897.7, filed on Jun. 1, 2010, entitled "Barcode Decoder Chip", 201010188826.7, filed on Jun. 1, 2010, entitled "One-Dimension Code Decoder Chip", all of which by Yali Sun, Dong Guo, Rongsheng Liu, Xianfu Wang, Lunyu Hu, Wenchuan Chen, Qiang Cai, Xiaodan Cai, Qingcai Zhang, Chunguang Zheng, Yousen Qiu, Zhilong Lin, Guoliang Zhuang and Zhiyu Wu, the disclosure for which are hereby incorporated herein in their entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present disclosure relates to the technical field of barcode identification, and particularly relates to a barcode decoding chip.

BACKGROUND OF THE INVENTION

Conventional barcode decoding devices correctly sense barcode direction by the aid of scan units, and cannot adjust decoding direction based on the barcode direction by itself. Therefore, these barcode decoding devices have their inconvenience in use and limitations in application.

Thus, in view of the above mentioned shortcomings of the conventional barcode decoding devices, there is an urgent need for a barcode decoding chip that can correctly identify bar space information of barcode and has improved decoding rate performance.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

Figure 1:
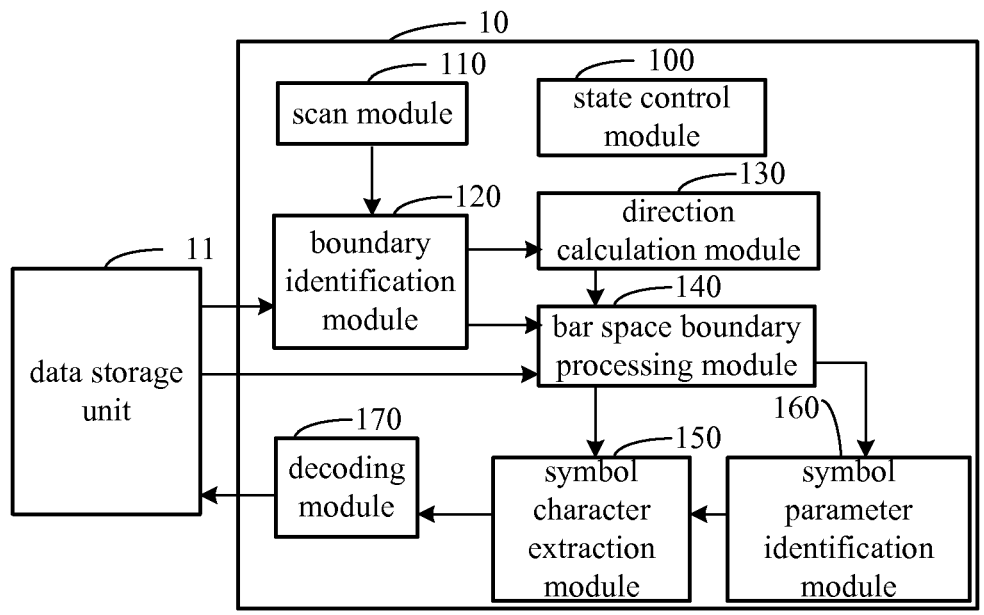
FIG. 1 shows a schematic view of a barcode decoding chip according to an embodiment of the present disclosure.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

FIG. 1 is a schematic view of a barcode decoding chip according to an embodiment of the present disclosure. The barcode decoding chip 10 of the present embodiment is connected to a data storage unit 11 which is used to store barcode image information. The barcode image information includes image pixel coordinates and gray values of image pixels and the like. The barcode image information is stored in the data storage unit 11 in a certain order. The data storage unit 11 further includes an address memory space (not shown) which is used to store image pixel coordinates, wherein an image pixel coordinate corresponding to an address bit in the address memory space. The image pixel coordinates is sequentially stored in the address memory space.

The barcode decoding chip 10 includes a state control module 100, a scan module 110, a boundary identification module 120, a direction calculation module 130, a bar space boundary processing module 140, a symbol character extraction module 150, a symbol parameter identification module 160 and a decoding module 170. The barcode decoding chip 10 of the present embodiment preferably employs streamlined structure of hardwares, in which various modules are constituted by hardware logic circuits, therefore adapted to perform streamlined operations and parallel processing on barcode image. Streamlined operations enable parallel processing on multi-frame or multi-row/multi-column image, parallel processing including simultaneous processing performed by several modules on the same data, which is beyond the ability of the decoding performed by software programs. Therefore, the barcode decoding chip 10 of the present embodiment can perform processing more quickly.

The state control module 100 is used to control working states and processing flows of the scan module 110, the boundary identification module 120, the direction calculation module 130, the bar space boundary processing module 140, the symbol character extraction module 150, the symbol parameter identification module 160 and the decoding module 170.

The following describes various modules of the barcode decoding chip according to the embodiment of the present disclosure one by one in detail with the reference to FIGS. 1-9.

Figure 2:
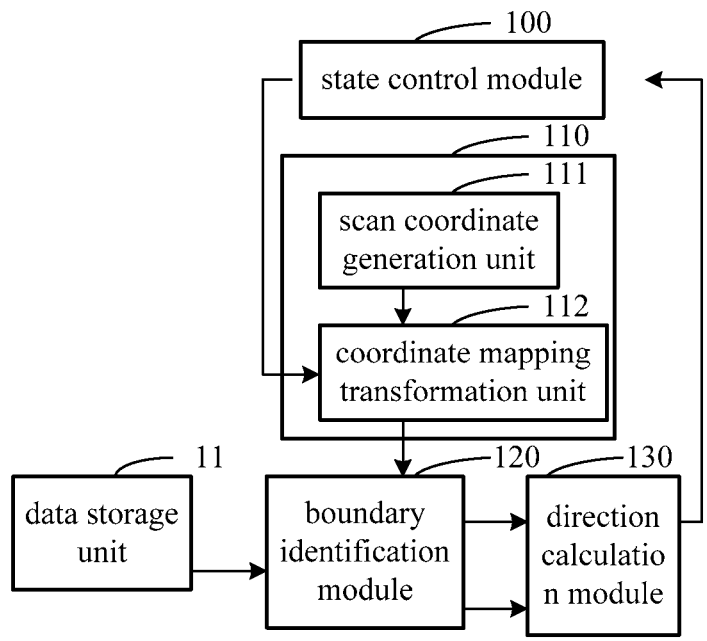
FIG. 2 shows a schematic view of a scan module of a barcode decoding chip according to an embodiment of the present disclosure.

FIG. 2 is a schematic view of a scan module of a barcode decoding chip according to an embodiment of the present disclosure.

The scan module 110 is used to create a scan coordinate system and generate scan coordinates. A scan coordinate corresponds to an address bit in the address memory space, which is used to scan barcode image information corresponding to the address bit in the data storage unit 11. The scan module 110 includes an initial scan coordinate generation unit 111 and a coordinate mapping transformation unit 112. The initial scan coordinate generation unit 111 is used to generate initial scan coordinates. The coordinate mapping transformation unit 112 is used to map the initial scan coordinates generated by the initial scan coordinate generation unit 111 into the address memory space of the data storage unit 11 through coordinate transformation for generating scan coordinates. The coordinate transformation functions of the coordinate mapping transformation unit 112 include at least one of the following: coordinate translation transformation, coordinate rotation transformation or coordinate axes exchange transformation or combination thereof. The coordinate transformation of the coordinate mapping transformation unit 112 makes possible to scan the barcode image in different directions.

The boundary identification module 120 reads the barcode image information corresponding to the address bits in the data storage unit 11 based on the scan coordinates generated by the scan module 110, in order to carry out virtual scan on the barcode image. The barcode image information includes image pixel coordinates and image pixel gray values. The virtual scan is to acquire the pixel coordinates and the gray values of the barcode image by scan circuits according to some logics. For instance, after the first row in the X direction is scanned along the horizontal direction, the Y direction increases a 10 pixel pitch, and then the second row in the X direction is continually scanned along the horizontal direction. The boundary identification module 120 calculates coordinate positions of the pixel points with gray differences on the virtual scan lines in order to acquire bar space boundary points at the intersections with the virtual scan lines. Generally speaking, as to barcode' bar and space, the bar is shown in black or dark, while space is showed in white or light color. Furthermore, the boundary identification module 120 can also identify barcode type based on the acquired bar space boundary points. In an embodiment of the present disclosure, the boundary identification module 120 may match the acquired bar space boundary points with bar space proportion of start character or stop character of certain row-column barcode such as PDF417, Micro PDF417 and the like, in order to identify whether the row-column barcode such as PDF417, Micro PDF417 and the like exits in the barcode image.

Figure 3:
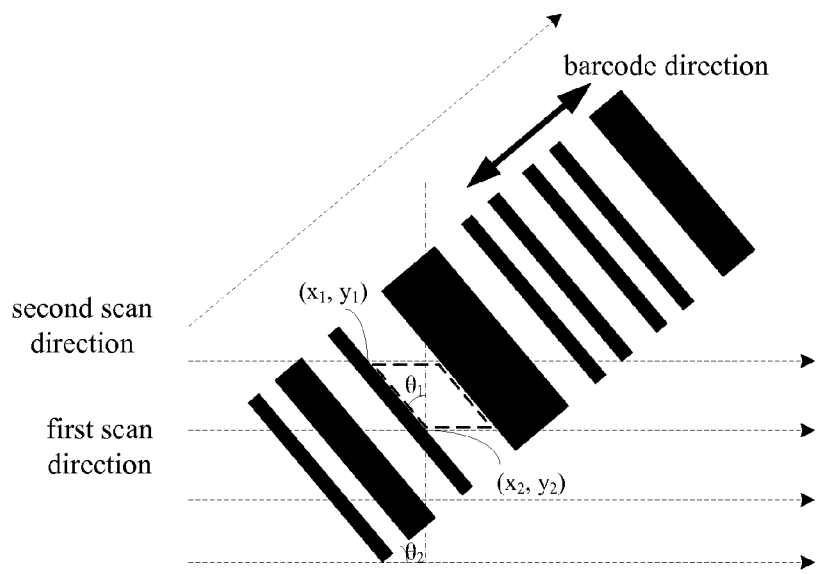
FIG. 3 shows a schematic view of principle of a method for identifying the barcode direction according to an embodiment of the present disclosure.

The direction identification module 130 calculates the barcode direction based on the bar space boundary points acquired by the boundary identification module 120. The following describes the method by which the direction identification module 130 acquires the barcode direction in detail. FIG. 3 is a schematic view of the method for identifying barcode direction according to an embodiment of the present disclosure. As shown in FIG. 3, because the barcode image is tilted, the identification decoding along the first scan direction (horizontal direction) as virtual scan line is impossible. Therefore, it is desirable to acquire the barcode direction and then adjust the virtual scan direction to a second scan direction. The angle enclosed by the first scan direction and the barcode direction is θ2 which is supplementary angle to the same angle as θ1, therefore θ1=θ2. Thus, given the slope tgθ1 of θ1, the slope tgθ2 of the barcode direction can be derived.

From FIG. 3, $$tg\theta 1 = -\frac{x_2 - x_1}{y_2 - y_1}$$

In the above formula, coordinates (x2, y2) and (x1, y1) can be derived from the intersections between the virtual scan lines and the bar spaces by the following steps: based on the coordinate values of the boundary points at the intersections of each virtual scan line and the bar spaces, identifying the parallelogram feature of each point by comparing X coordinate positions and comparing Y coordinate positions; calculating the coordinates of the pixel points located at (x2, y2) and (x1, y1) in the parallelogram feature; thereby calculating the value of tgθ1, so as to derive the barcode direction. The above mentioned parallelogram feature can be substituted by a parallel lines feature, and the above mentioned parallelogram feature and parallel lines feature are not restricted in the range of one bar space.

After the barcode direction is acquired from the calculation by the direction identification module 130, the bar space boundary processing module 140 processes barcode image according to the barcode direction in order to acquire accurate bar space boundaries in the barcode image.

Figure 4:
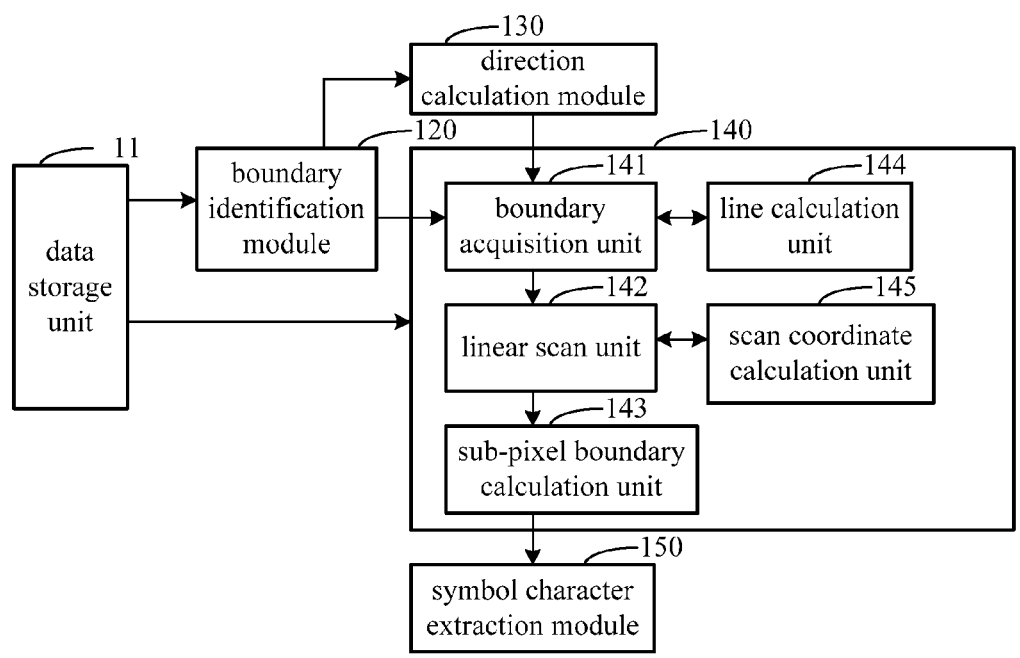
FIG. 4 shows a schematic view of a bar space boundary processing module of a barcode decoding chip according to an embodiment of the present disclosure.
Figure 5:
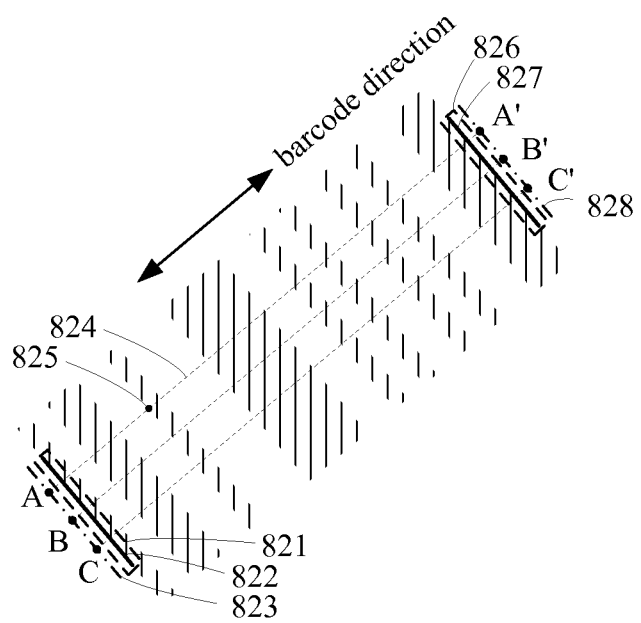
FIG. 5 shows a schematic view of a principle by which the bar space boundary processing module processes barcode image according to an embodiment of the present disclosure.
Figure 6:
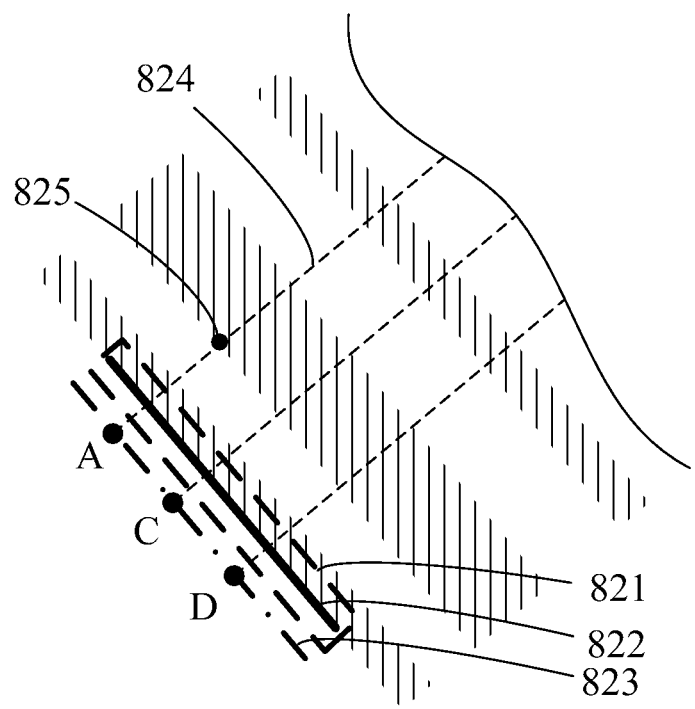
FIG. 6 shows a partially enlarged view of the barcode image processing.

FIG. 4 is a schematic view of a bar space boundary processing module of a barcode decoding chip according to an embodiment of the present disclosure. As shown in FIG. 4, the bar space boundary processing module 140 further includes a scan boundary acquisition unit 141, a linear scan unit 142, a sub-pixel boundary calculation unit 143, a line calculation unit 144 and a scan coordinate calculation unit 145. FIG. 5 is a schematic view of a principle by which an bar space boundary processing module 140 processes barcode image according to an embodiment of the present disclosure. FIG. 6 is a partial enlarged view of a barcode image processing. The following will describe structures and functions and processing flows of various units in the bar space boundary processing module 140.

As shown in FIG. 4, the scan boundary acquisition unit 141 connects to the boundary identification module 120 and the direction calculation module 130. The scan boundary acquisition unit 141 acquires the bar space boundary points from the boundary identification module 120 and acquires the barcode direction from the direction calculation module 130.

As shown in FIG. 5 and FIG. 6, the scan boundary acquisition unit 141 takes the bar space boundary points on both sides as centers, and extends outwards along the barcode direction and the direction perpendicular to the barcode direction, and establishes boundary regions 821 and 826 which include the bar space boundary points on both sides and a set of pixel points near the bar space boundary points on both sides. The scan boundary acquisition unit 141 inputs the set of pixel points in the boundary regions 821 and 826 into a line calculation unit 144 which performs Hough operation on the set of pixel points in the boundary regions 821 and 826. The basic principle of Hough operation is as follows: suppose there is a line at distance ρ from the origin with an azimuth θ in the Cartesian coordinate system, then each point on the line satisfy the formula ρ=x cos θ+y sin θ. During the barcode boundary searching process, with the image space coordinate x, y of each pixel point, the pixel coordinates corresponding to the line can be derived by calculating the corresponding ρ through the above mentioned operational formula utilizing different discrete values of θ, and carrying out statistical analysis on the discrete values of θ and the value of ρ. In an embodiment of the present disclosure, the line calculation unit 144 can for example employ several cordic iterative operation units connected in serial to perform Hough operation on the set of pixel points in order to acquire the coordinates of the line.

The line calculation unit 144 derives the pixel point coordinates of the boundary line 822 corresponding to the barcode boundary in the boundary region 821 and the pixel point coordinates of the boundary line 827 corresponding to the barcode boundary in the boundary region 826 through Hough operation, and returns the results of the operation to the scan boundary acquisition unit 141. The boundary lines 822 and 827 reflect the linear feature of the bar space boundaries in the boundary regions 821 and 826.

The scan boundary acquisition unit 141 translates the pixel point coordinates of the boundary line 822 and the boundary line 827 outwards of the barcode region by a predetermined distance and obtains scan boundary 823 and scan boundary 828, wherein, the predetermined distance is a pitch of about 5-10 pixel points. The boundary line 822 and the boundary line 827 reflect the linear feature of the bar space boundaries. However, due to the influence of the barcode printing or barcode imaging, the actual bar space boundaries in the barcode image are not strictly straight lines, but curves based on linear feature with slight variations or sets of several line segments. In order to acquire more accurate bar space boundaries, the scan boundary acquisition unit 141 translates the pixel point coordinates of the boundary line 822 and the boundary line 827 outwards so as to include the curves based on linear feature with slight variations or sets of several line segments in the range of the boundary line 823 and the boundary line 828. Afterwards, the scan boundary acquisition unit 141 inputs the boundary line 823 and the boundary line 828 into the linear scan unit 142 for further processing.

The linear scan unit 142 selects point A on the scan boundary 823 on one side and acquires point A' on the scan boundary 828 on the other side, point A' corresponding to the point A. There are several ways to acquire point A'. In an embodiment of the present disclosure, one way to acquire point A' is as follows: taking the point A as a start point; searching on the scan boundary 828 for point A' which is collinear with the point A along the barcode direction (i.e., the value of tgθ1); based on a known line, coordinate of point A outside the line and the slope of another line that pass point A, calculating coordinate of point A' at the intersection between the know line and another line. In another embodiment of the present disclosure, another way to acquire point A' is to calculate coordinate of a point on the scan boundary 828 with the shortest distance from point A, and that coordinate point is point A'.

The linear scan unit 142 takes A as scan start point and takes A' as scan end point, and calculates the coordinates of the pixel points on line 824 between A and A'. The linear scan unit 142 inputs the coordinate values of point A and point A' into the scan coordinate calculation unit 145 which calculates the coordinates of the pixel points 825 of the line 824 between A and A'.

There are several methods for the scan coordinate calculation unit 145 to calculate the coordinates of the pixel points 825. In an embodiment of the present disclosure, the scan coordinate calculation unit 145 includes Bresenham operation unit which calculates the coordinate of each point on the line 824 between A and A'. The principle of Bresenham algorithm is as follows: pixel points constitute barcode image and lines that pass centers of pixels on each row and each column in the barcode image constitute a group of virtual grid lines. The algorithm includes calculating the intersection between the line and each perpendicular grid line from the start point and the end point of the line and indentify the pixel closest to the intersection among the pixels on the column. The advantage of the Bresenham algorithm lies in that it employs incremental calculation such that for each column, the coordinate of the desired pixel point on the column can be acquired by simply checking the symbol of an error term. In Bresenham algorithm, because the entire process of calculating coordinate of each point on a line between two points is performed with integers, the calculation speed can be significantly enhanced.

The scan coordinate calculation unit 145 returns the calculated coordinates of the pixel points 825 on the line 824 between point A and point A' to the linear scan unit 142 which inputs the coordinates of the pixel points 825 on the line 824 between point A and point A' into the sub-pixel boundary calculation unit 143.

The sub-pixel boundary calculation unit 143 calculates sub-pixel boundaries based on the coordinates of the pixel points 825 between point A and point A' and divides units corresponding to the pixel points 825 into smaller units in order to acquire precise coordinates of the bar space boundaries and calculate the values of gray differences corresponding to the precise coordinates.

Thereby, the bar space boundary processing module 140 acquires the precise bar space boundaries in the barcode image and the values of gray differences corresponding to the precise coordinates and inputs the bar space boundaries data into the symbol character extraction module 150 and the symbol parameter identification module 160.

Figure 7:
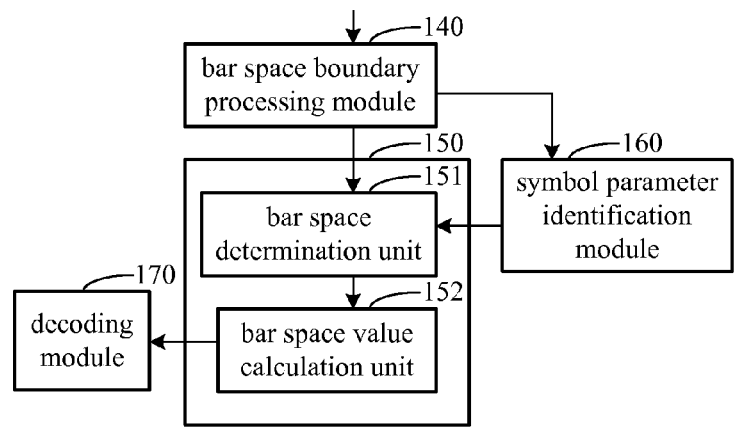
FIG. 7 shows a schematic view of a symbol character extraction module of a barcode decoding chip according to an embodiment of the present disclosure.

FIG. 7 is a schematic view of a symbol character extraction module 150 of a barcode decoding chip according to an embodiment of the present disclosure. As shown in FIG. 7, the symbol character extraction module 150 includes a bar space determination unit 151 and a bar space value calculation unit 152.

In the symbol character extraction module 150, the bar space determination unit 151, which connects to a symbol parameter identification module 160 and the bar space boundary processing module 140 at one end, and connects to a bar space value calculation unit 152 at the other end, stores the bar space boundaries data provided by the bar space boundary processing module 140 and identifies and removes the disturbing boundaries so as to acquire valid bar space boundaries combination.

The symbol parameter identification module 160 identifies symbol parameters of a barcode based on the bar space boundaries data provided by the bar space boundary processing module 140. As to one-dimensional barcode, the symbol parameters includes the number of the bar space boundaries of the symbol characters of the barcode, the bar space widths of the symbol characters and checking information, and the like. As to row-column barcode, the symbol parameters includes the numbers of rows and the number of columns of the barcode, row number and column number of the barcode, the number of the bar space boundaries of the symbol characters, the bar space widths of the symbol characters, checking information and the like. The methods by which the symbol parameter identification module 160 identifies the symbol parameters include cluster number calculation, code system determination and the like.

The bar space determination unit 151 processes the bar space boundaries data provided by the bar space boundary processing module 140 based on the symbol parameters provided by the symbol parameter identification module 160, and removes disturbing boundaries therein. The detailed work process of the bar space determination unit 151 are as follows: when the number of the bar space boundaries stored in the bar space determination unit 151 does not reach the number of bar space boundaries in the symbol parameters, the bar space determination unit 151 continues to acquire the bar space boundaries data provided by the bar space boundary processing module 140. When the number of the bar space boundaries stored in the bar space determination unit 151 reaches the number of bar space boundaries in the symbol parameters, the bar space determination unit 151 calculates the values of the bar space widths of the stored bar space boundaries combination, and compares the values of the bar space widths of the stored bar space boundaries combination with the values of the bar space widths in the symbol parameters. When the values of the bar space widths of the stored bar space boundaries combination are smaller than the values of the bar space widths in the symbol parameters, the bar space determination unit 151 removes the bar space boundaries with smallest stored gray difference widths; and then continue to acquire bar space boundaries provided by the bar space boundary processing module 140. When the values of the bar space widths of the stored bar space boundaries combination equal the values of the bar space widths in the symbol parameters, the bar space determination unit 151 outputs the stored bar space boundaries combination to the bar space value calculation unit 152.

The bar space value calculation unit 152 acquires the values of the coordinates and gray differences of various bar space boundaries in the bar space boundaries combination, calculates values of the bar space widths constituted by various bar space boundaries by comparison, thereby acquires symbol characters, and inputs the calculated symbol characters into a decoding module 170.

Figure 8:
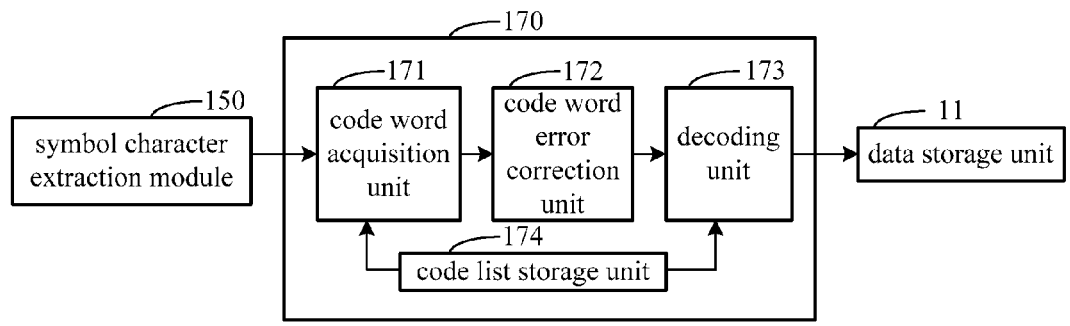
FIG. 8 shows a schematic view of a decoding module of a barcode decoding chip according to an embodiment of the present disclosure.

FIG. 8 is a schematic view of a decoding module of a barcode decoding chip according to an embodiment of the present disclosure. As shown in FIG. 8, the decoding module 170 of the present embodiment includes a code word acquisition unit 171, a code word error correction unit 172, a decoding unit 173 and a code list storage unit 174. The decoding module 170 converts the symbol characters provided by the symbol character extraction module 150 into code words and performs error correction decoding to acquire barcode information, and then inputs the barcode information into a decoded information storage zone of the data storage unit 11.

In the decoding module 170, the code list storage unit 174 stores a code list indicating the corresponding relationship between the symbol characters and the code words. The code word acquisition unit 171 acquires initial code words utilizing the received symbol characters according to the code list. The code word error correction unit 172 performs RS (Reed-Solomon) error correction processing on the initial code words in order to acquire the correct code words. The decoding unit 173 acquires correct symbol characters utilizing the correct code words according to the code list, and decodes the character set corresponding to the correct symbol characters in order to acquire barcode information.

The code list storage unit 174 stores the code list indicating the corresponding relationship between the symbol characters and the code words, wherein, the symbol characters correspond to various bar space value combination of the barcode. The code list storage unit 174 stores the code list into a ROM (Read-Only Memory).

Figure 9:
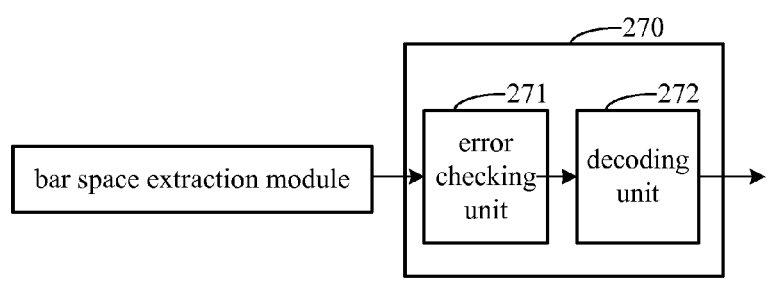
FIG. 9 shows a schematic view of a decoding module of a barcode decoding chip according to another embodiment of the present disclosure.

FIG. 9 is a schematic view of a decoding module of a barcode decoding chip according to another embodiment of the present disclosure. As shown in FIG. 9, the decoding module 270 of the present embodiment includes an error checking unit 271 and a decoding unit 272. The decoding module 270 performs error checking on the symbol characters provided by the symbol character extraction module 150, acquires barcode information based on the character set corresponding to the symbol characters, and then inputs the barcode information into a decoded information storage zone of the data storage unit.

The barcode decoding chip of the present disclosure is suitable for one-dimensional barcode and row-column barcode such as PDF417, Micro PDF417, composite code and the like. The barcode decoding chip of the present disclosure can automatically identify barcode direction and can identify and decode barcode image without adjusting scan direction of scan unit by the user. Furthermore, the barcode decoding chip of the present disclosure can identify the barcode boundaries with high precision and decodes with high success rate.

The barcode decoding chip of the present disclosure is able to adjust decoding direction according to barcode direction, and acquire precise coordinate values of the barcode boundaries, thus enhances the decoding success rate, particularly suitable for the identification and decoding of high density barcode or distorted barcode.

The barcode decoding chip of the present disclosure employs streamlined structure of hardwares and identifies and decodes barcode image by hardware logics. Because the streamlined structure of hardwares is adapted to perform streamlined operations and parallel processing on barcode image, it can process quickly. The entire structure is made up by hardware and no processor is involved for decoding, so the chip structure can be simplified, easier to be integrated and easier to be portable and has the advantages of smaller footprint, lower power consumption, and lower cost, comparing to processors. Besides, it can be conveniently used in conjunction with the technology of internet of things, and thus provides a broader space for further development for the application of barcode technology.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. A barcode decoding chip, comprising:
(a) a scan module which generates scan coordinates corresponding to address bits in address memory space of a data storage unit, the scan module being configured for scanning a barcode image in the data storage unit, wherein the barcode image includes image pixels that each image pixel has a coordinate and a gray value;
(b) a boundary identification module which reads the barcode image based on the scan coordinates and calculates bar space boundary points in the barcode image with the read image pixels;
(c) a direction identification module which calculates a barcode direction with the bar space boundary points acquired by the boundary identification module;

(d) a bar space boundary processing module which processes the barcode image based on the barcode direction to acquire bar space boundaries in the barcode image;

(e) a symbol parameter identification module which identifies symbol parameters of the barcode image based on the bar space boundaries;

(f) a symbol character extraction module which calculates symbol characters with the bar space boundaries and the symbol parameters;

wherein the symbol character extraction module comprises a bar space determination unit which processes the bar space boundaries based on the symbol parameters, removes disturbing boundaries among the bar space boundaries, and acquires valid bar space boundaries combination, and wherein the symbol character extraction module comprises a bar space value calculation unit which compares bar space widths constituted by the valid bar space boundaries combination to acquire the symbol characters; and (g) a decoding module which converts the symbol characters into barcode information.

2. The barcode decoding chip of claim 1, wherein the scan module comprises an initial scan coordinate generation unit which generates initial scan coordinates, and a coordinate mapping transformation unit which maps the initial scan coordinates into the address memory space through coordinate transformation for generating scan coordinates.

3. The barcode decoding chip of claim 1, wherein the boundary identification module calculates gray differences among the read image pixels to acquire the bar space boundary points of the barcode image.

4. The barcode decoding chip of claim 1, wherein the boundary identification module identifies barcode type based on the bar space boundary points of the barcode image.

5. The barcode decoding chip of claim 4, wherein the boundary identification module matches the bar space boundary points with a bar space proportion of start character or stop character of a candidate barcode to identify whether the candidate barcode exists in the barcode image.

6. The barcode decoding chip of claim 1, wherein the direction identification module compares coordinate positions of the bar space boundary points to identify a feature relationship between the bar space boundary points, and calculates the barcode direction based on coordinate values of the bar space boundary points lying in the same feature relationship.

7. The barcode decoding chip of claim 6, wherein the feature relationship comprises parallelogram feature or parallel lines feature.

8. The barcode decoding chip of claim 1, wherein the bar space boundary processing module comprises:

(a) a scan boundary acquisition unit which calculates scan boundaries based on the bar space boundary points and the barcode direction;

(b) a linear scan unit which selects a scan start point and a scan end point corresponding to the scan start point based on the scan boundaries, and calculates coordinates of pixel points on a line between the scan start point and the scan end point, and (c) a sub-pixel boundary calculation unit which calculates the coordinates of the bar space boundaries based on the coordinates of the pixel points and gray values of the pixel points.

9. The barcode decoding chip of claim 8, wherein the scan boundary acquisition unit takes the bar space boundary points on both sides of the barcode image as centers, extends outwards along the barcode direction, and establishes boundary regions, the boundary regions comprising the bar space boundary points on the both sides of the barcode image and a set of pixel points near the bar space boundary points on the both sides of the barcode image.

10. The barcode decoding chip of claim 9, wherein the bar space boundary processing module also comprises a line calculation unit, the line calculation unit used to acquire boundary lines corresponding to the boundary regions through Hough operation.

11. The barcode decoding chip of claim 10, wherein the line calculation unit employs several cordic iterative operation units connected in serial to perform Hough operation on the set of pixel points in order to acquire coordinates of the boundary lines.

12. The barcode decoding chip of claim 10, wherein the scan boundary acquisition unit translates the boundary lines outwards along the barcode direction by a predetermined distance to obtain the scan boundaries.

13. The barcode decoding chip of claim 8, wherein the bar space boundary processing module also comprises a scan coordinate calculation unit, the scan coordinate calculation unit calculates coordinates of the pixel points on the line between the scan start point and the scan end point through Bresenham algorithm.

14. The barcode decoding chip of claim 1, wherein the symbol parameters comprise one of the following: a number of rows and a number of columns of the barcode image, a row number and a column number of the barcode image, a number of the bar space boundaries of the symbol characters, bar space widths of the symbol characters, checking information or combination thereof.

15. The barcode decoding chip of claim 1, wherein the symbol parameters comprise one of the following: a number of the bar space boundaries of symbol characters of the barcode image, bar space widths of the symbol characters, checking information or combination thereof.

16. The barcode decoding chip of claim 1, wherein the decoding module comprises:

(a) a code list storage unit which generates a code list representing a corresponding relationship between the symbol characters and code words;

(b) a code word acquisition unit which acquires initial code words utilizing received symbol characters according to the code list;

(c) a code word error correction unit which performs RS (Reed-Solomon) error correction on the initial code words to acquire correct code words; and (d) a decoding unit which acquires correct symbol characters utilizing the correct code words based on the code list, and decodes a character set corresponding to the correct symbol characters to acquire the barcode information.

17. The barcode decoding chip of claim 1, wherein the decoding module comprises:

(a) an error checking unit which checks the symbol characters for error; and (b) a decoding unit which acquires the barcode information from a character set corresponding to the symbol characters.

* * * * *